(12) United States Patent
Aepli et al.

(10) Patent No.: US 11,807,718 B2
(45) Date of Patent: Nov. 7, 2023

(54) POLYAMIDE MOULDING COMPOSITIONS FOR GLASS COMPOSITES

(71) Applicant: EMS-PATENT AG, Domat/Ems (CH)

(72) Inventors: Etienne Aepli, Domat/Ems (CH);
Georg Stoppelmann, Bonaduz (CH);
Botho Hoffmann, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 830 days.

(21) Appl. No.: 16/719,277

(22) Filed: Dec. 18, 2019

(65) Prior Publication Data
US 2020/0199362 A1    Jun. 25, 2020

(30) Foreign Application Priority Data

Dec. 19, 2018   (EP) .................................... 18214070

(51) Int. Cl.
| | |
|---|---|
| *C08L 77/06* | (2006.01) |
| *C08J 3/20* | (2006.01) |
| *C09J 177/06* | (2006.01) |
| *C08G 69/26* | (2006.01) |
| *B29C 45/00* | (2006.01) |
| *B29K 77/00* | (2006.01) |

(52) U.S. Cl.
CPC .............. *C08G 69/26* (2013.01); *C08J 3/203* (2013.01); *C08L 77/06* (2013.01); *C09J 177/06* (2013.01); *B29C 45/0001* (2013.01); *B29K 2077/00* (2013.01); *C08J 2377/06* (2013.01); *C08J 2477/06* (2013.01); *C08J 2479/02* (2013.01); *C08L 2205/025* (2013.01); *C08L 2205/03* (2013.01); *C08L 2205/06* (2013.01)

(58) Field of Classification Search
CPC ........ C08F 77/06; C08J 3/203; C08J 2479/02; C08J 2477/06; C08J 2377/06; C09J 177/06; C08L 2205/025; C08L 2205/03; C08L 2205/06
See application file for complete search history.

(56) References Cited

U.S. PATENT DOCUMENTS

| | | | |
|---|---|---|---|
| 2002/0037972 A1* | 3/2002 | Maul ....................... | C08L 77/00 525/419 |
| 2012/0004353 A1 | 1/2012 | Prusty et al. | |
| 2012/0214904 A1* | 8/2012 | Prusty ..................... | C08K 3/08 523/216 |

FOREIGN PATENT DOCUMENTS

| | | |
|---|---|---|
| EP | 0 150 444 A2 | 8/1985 |
| EP | 1 065 236 A2 | 1/2001 |
| EP | 0 951 493 B1 | 6/2001 |
| EP | 1 341 832 | 9/2003 |
| EP | 1 456 265 | 9/2004 |
| EP | 1 541 336 A1 | 6/2005 |
| JP | 2015-199938 A | 11/2015 |
| WO | 02/00780 A2 | 1/2002 |
| WO | 2005/097861 A1 | 10/2005 |
| WO | 2006/084862 A1 | 8/2006 |
| WO | 2010/076145 A1 | 7/2010 |
| WO | 2011/138300 A1 | 11/2011 |
| WO | 2015/024911 A1 | 2/2015 |
| WO | 2015/024912 A | 2/2015 |

OTHER PUBLICATIONS

European Search Report for EP18214070 dated Jun. 7, 2019.
English Translation of JP 2015-199938 A; Published Nov. 12, 2015; previously cited on SB/08 form filed Dec. 18, 2019.

* cited by examiner

*Primary Examiner* — Robert D Harlan
(74) *Attorney, Agent, or Firm* — Sughrue Mion, PLLC (57) ABSTRACT

Thermoplastic polyamide moulding composition consisting of:

(A) 30-99.9 percent by weight of at least one polyamide selected from the group consisting of: at least one aliphatic or semiaromatic polyamide, in each case with C:N ratio at least 8; at least one aliphatic or semiaromatic polyamide composed of at least one dicarboxylic acid and of at least one diamine and also optionally a proportion below 50 mol percent based on the entirety of dicarboxylic acids and diamine as 100 mol percent, of lactams and/or aminocarboxylic acids; and mixtures thereof;

(B) 0.1-5.0 percent by weight of polyethyleneimine (PEI) or copolymers or derivatives thereof;

(C) 0-60 percent by weight of fillers and/or reinforcing materials;

(D) 0-5.0 percent by weight of additives;

where the entirety of (A)-(D) provides 100% of the thermoplastic polyamide moulding composition, and also uses of such moulding compositions in particular in the context of components bonded to mineral glass.

17 Claims, 1 Drawing Sheet

POLYAMIDE MOULDING COMPOSITIONS FOR GLASS COMPOSITES

TECHNICAL FIELD

The present invention relates to thermoplastic polyamide moulding compositions, which are particularly suitable for composite structures with mineral glass, and using a layer of polyurethane as adhesive. The present invention further relates to corresponding polyamide/mineral-glass composites, and to uses of specific additives to polyamide moulding compositions, specifically polyethyleneimines, to improve the adhesion to polyurethane.

PRIOR ART

Thermoplastic polyamide materials are widely used in many sectors for the production of structural components inter alia because of their good mechanical properties, chemicals resistance, good processability, low density, etc., in particular in the automobile sector, but also in the electronics sector, for example for cases of portable devices.

In particular in the mobile telephones sector, but also in the computer and portable computer sectors, display applications use glass panels. These panels, made of mineral glass, must be bonded to the case constituents, with maximized adhesion. Adhesive bonding of glass is generally achieved in industry by use of polyurethane adhesive. This exhibits excellent adhesion on mineral glass and, in particular when configured as hot-melt adhesive, has ideal processing properties.

A problem arising in this context is, however, that adhesion between polyurethane adhesive and polyamide is inadequate. If the polyurethane adhesive is modified, the excellent adhesion properties in relation to mineral glass are lost, and if the polyamide is modified, the excellent mechanical properties and good processability, and also the other above-mentioned properties of the polyamide, are lost.

This provides the starting point for the present invention.

US2012/214904 discloses thermoplastic moulding compositions comprising A) 10 to 99.999% by weight of a polyimide B), 0.001 to 20% by weight of iron powder with particle size at most 10 μm (d50 value), obtainable via thermal decomposition of iron pentacarbonyl, C) 0 to 70% by weight of other additives, where the sum of the percentages by weight of components A) to C) is 100%.

According to US2002/037972, it is possible to produce transparent moulding compositions by mixing 50 to 99 parts by weight of a transparent polyamide and 1 to 50 parts by weight of a graft copolymer, the sum of the parts by weight of the transparent polyamide and of the graft copolymer therefore being 100. The graft copolymer is produced by reacting 0.5 to 25% by weight, based on the graft copolymer, of a branched polyamine having at least 4 carbon atoms and number-average molar mass Mn at least 146 g/mol with polyamide selected from the group consisting of lactams, ω-aminocarboxylic acids, equimolar combinations of diamine and dicarboxylic acid and combinations thereof.

JP2015199938 discloses a polyamide resin composition with excellent heat-ageing resistance. The polyamide resin composition comprises (A) polyamide resin, (B) metal alluminate and (C) polyethyleneimine polymer, and has Mw/Mn ratio of 2.0 or more and, after heat-ageing for 1000 hours at 120° C., 3.0 or more.

DESCRIPTION OF THE INVENTION

The invention accordingly has the object of providing a thermoplastic polyamide moulding composition which has mechanical properties suitable for the applications mentioned but at the same time also can be bonded to mineral glass in a simple procedure with use of polyurethane adhesives and with excellent adhesion force.

This object is achieved by way of the subject matter of the claims, in particular by way of a thermoplastic polyamide moulding composition modified according to the invention, by way of a composite of at least one layer based on polyamide, of an adjoining polyurethane adhesive layer, and an adjoining layer made of mineral glass, and also by way of a use of polyethyleneimines, or copolymers or derivatives thereof, in a polyamide moulding composition in order to improve the adhesion to polyurethane.

As gist of the invention, therefore, the invention is mainly concerned with the unexpected discovery that addition of polyethyleneimines to a thermoplastic polyamide matrix leads to an exceptional increase of adhesion to polyurethane, in particular to polyurethane that is usually used for adhesive bonding to mineral glass, without any resultant loss of advantageous mechanical properties. This is highly surprising because, inter alia, a simple increase of the number of terminal amino groups in the polyamide, for example through appropriate conduct of the reaction to produce a corresponding polyamide material, cannot in any way improve adhesion properties in relation to polyurethane to the same extent, and moreover has the disadvantage that the increased number of terminal amino groups has a serious adverse effect on the mechanical properties of the polyamide material.

It has in principle been disclosed in other sectors that polyethyleneimines can be admixed with a polyamide material, but this has not been disclosed in connection with the issue of adhesion to polyurethane, and moreover has not been disclosed in connection with specific polyamide matrix systems of the type described here.

Specific reference may be made to the following documents in connection with the prior art: WO-A-0200780 describes, for use in particular in the automobile sector for components exposed to diesel fuel at high temperatures, thermoplastic moulding compositions based on in particular polyoxymethylenenes (POM) comprising, as substantive components, A) 29 to (100% by weight minus 1 ppb) of at least one thermoplastic polymer, B) 1 ppb to 1% by weight of at least one polyethyleneimine homo- or -copolymer, and also moreover C) 0 to 70% by weight of other additional substances, where the percentages by weight of components A) to C) always provide 100%.

WO-A-2006084862 describes, for components exposed to high temperatures, for example for structural components in the automobile sector, thermoplastic moulding compositions comprising: A) 10 to 99% by weight of at least one thermoplastic polyamide, in particular polyamide 6, B) 0.1 to 5% by weight of at least one polyethyleneimine homo- or copolymer, C) 0.05 to 3% by weight of a lubricant, D) 0.05 to 3% by weight of a copper-containing stabilizer or of a sterically hindered phenol or a mixture of these, E) 0 to 60% by weight of other additional substances, where the sum of the percentages by weight of components (A) to (E) is 100%.

The thermoplastic polyamide moulding compositions proposed here for the purposes of this application are preferably free from lubricants that can be selected as follows by way of example: aluminium salts, alkali metal salts, alkaline earth metal salts or esters or amides of fatty acids having 10 to 44 carbon atoms, for example having 12 to 40 carbon atoms. The metal ions are by way of example alkaline earth metal and Al, but it is equally possible to use Ca or Mg here. The metal salts are by way example Ca stearate and Ca montanate, and also Al stearate. It is also possible to use, as lubricants of this type, mixtures of various salts in any desired mixing ratio. The carboxylic acids can be monobasic or dibasic. The following may be mentioned as examples: pelargonic acid, palmitic acid, lauric acid, margaric acid, dodecanedioic acid, behenic acid and particularly preferably stearic acid, capric acid, and also montanic acid (mixture of fatty acids having 30 to 40 carbon atoms). The aliphatic alcohols can be monohydric to tetrahydric. Examples of alcohols are n-butanol, n-octanol, stearyl alcohol, ethylene glycol, propylene glycol, neopentyl glycol and pentaerythritol, frequently glycerol and pentaerythritol. The aliphatic amines can be mono- to trifunctional. Examples of these are stearylamine, ethylenediamine, propylenediamine, hexamethylenediamine, and di(6-aminohexyl)amine. Esters or amides are correspondingly glycerol distearate, glycerol tristearate, ethylenediamine distearate, glycerol monopalmitate, glycerol trilaurate, glycerol monobehenate and pentaerythritol tetrastearate. It is also possible to use mixtures of various esters or amides or esters with amides in combination, in any desired mixing ratio. It is preferable, as said above, that these lubricants are not present in the moulding composition proposed here.

WO-A-2010076145 describes, likewise for components exposed to high temperatures, for example for structural components in the automobile sector, thermoplastic moulding compositions comprising A) 10 to 99.94% by weight of a polyamide, in particular polyamide 6, B) 0.05 to 5% by weight of a polyethyleneimine homo- or copolymer, C) 0.01 to 20% by weight of iron powder, D) 0 to 70% by weight of other additional substances, where the sum of the percentages by weight of A to D is 100%.

The thermoplastic polyamide moulding compositions proposed here for the purposes of this application are preferably free from such iron powder.

WO-A-2015024912, and similarly WO2015024911, describe a composite plastics part which comprises a first plastics component and a second plastics component and, therebetween, a polyethyleneimine to improve adhesion. It moreover relates to a process for the production of the said composite plastics parts, a process to improve adhesion between a first plastics component and a second plastics component in a composite plastics part, and also use of polyethyleneimine to improve adhesion between a first plastics component and a second plastics component in a composite plastics part. In the process described, the parts are moulded directly onto one another without adhesion promoter, and the effects are demonstrated exclusively for two components made of Polyamide 6.

WO-A-2011138300 describes a composite part made of at least one constituent made of a polyamide moulding composition and of at least one constituent made of a vulcanized elastomer, for example EPDM, EPM, ACM, fluororubber, NBR, H-NBR or AEM, individually or in combination. The polyamide moulding composition here consists of at least 40% by weight of a mixture of the following components: a) 60 to 99 parts by weight of polyamide and b) 1 to 40 parts by weight of a graft copolymer which can be produced with use of the following monomers: a) 0.5 to 25% by weight, based on the graft copolymer, of a polyamine having at least 4 nitrogen atoms and b) 75 to 99.5% by weight, based on the graft copolymer, of polyamide-forming monomers selected from lactams, ω-aminocarboxylic acids and/or equimolar combinations of diamine and di carboxylic acid, where the sum of the parts by weight of a) and b) is 100. The presence of the graft copolymer is said to result in improved adhesion between the constituents.

The thermoplastic polyamide moulding compositions and composite parts proposed here for the purposes of this application are free from such elastomer elements which by way of example can be EPDM, EPM, ACM, fluororubber, NBR, H-NBR or AEM, individually or in combination. The elastomers used can take the form of a compounded rubber which by way of example comprise oils, fillers, vulcanizing agents and/or vulcanization activators. The thermoplastic polyamide moulding compositions proposed here are moreover preferably free from graft copolymer which can be produced with use of the following monomers: a) 0.5 to 25% by weight, based on the graft copolymer, of a polyamine having at least 4 nitrogen atoms and b) 75 to 99.5% by weight, based on the graft copolymer, of polyamide-forming monomers selected from lactams, w-aminocarboxylic acids and/or equimolar combinations of diamine and dicarboxylic acid, where the sum of the parts by weight of a) and b) is 100.

It is preferable here for the purposes of this application to use exclusively ungrafted polyethyleneimines as component (B), so that the entire moulding composition is free from grafted polyethyleneimines.

EP-A-1541336 relates to a thermoplastic multilayer composite composed of at least one first layer based on fluoropolymers, and on at least one further, second layer which, at least in regions, directly adjoins the first layer. Adhesion between the two layers in this type of multilayer composite is achieved in that the second layer is based on polyamide/polyamine copolymers. This type of second layer can in particular be used advantageously as adhesion-promoter layer in relation to a further, third layer based on polyamide. When configured as hollow body or as hollow profile, this type of structure made of at least 3 layers can be used as fuel line in the motor vehicle sector.

It is preferable for the purposes of this application to use, as component (B), exclusively polyethyleneimines which comprise no amide-forming copolymer units, so that the entire moulding composition is free from polyethyleneimines configured as copolymers, and in particular is free from polyethyleneimines that comprise amide-forming copolymer units, or free from polyethyleneimines that are copolymers with Polyamide 6.

The moulding composition is moreover preferably free from aluminium salts, in particular free from aluminates, i.e. salts of the aluminium acid $HAlO_2 \cdot H_2O$.

EP-A-1065236 describes a graft copolymer which has improved resistance to solvent and to fuel and which is produced with use of the following monomers: a) 0.5 to 25% by weight, based on the graft copolymer, of a polyamine having at least 11 nitrogen atoms, its number-average molar mass being at least 500 g/mol; b) polyamide-forming monomers selected from lactams and w-aminocarboxylic acids; c) oligocarboxylic acids selected from 0.015 to about 3 mol % of dicarboxylic acid and 0.01 to about 1.2 mol % of tricarboxylic acid, based in each case on lactam and, respectively, w-aminocarboxylic acid, where the Amino group concentration of the graft copolymer is in the range 100 to 2500 mmol/kg.

Specifically, the present invention correspondingly provides a thermoplastic polyamide moulding composition consisting of:
(A) 30-99.9 percent by weight of at least one polyamide selected from the group consisting of: at least one aliphatic or semiaromatic polyamide, in each case with C:N ratio at least 8, preferably at least 9, with particular preference precisely 9; at least one aliphatic or semiaromatic polyamide composed of at least one dicarboxylic acid and of at least one diamine and also optionally a proportion below 50 mol percent based on the entirety of dicarboxylic acids and diamine as 100 mol percent, of lactams and/or aminocarboxylic acids; and mixtures thereof;

(B) 0.1-5.0 percent by weight of polyethyleneimine (PEI) or copolymers or derivatives thereof;

(C) 0-60 percent by weight of fillers and/or reinforcing materials;

(D) 0-5.0 percent by weight of additives;

where the entirety of (A)-(D) provides 100% of the thermoplastic polyamide moulding composition.

For the purposes of the present invention, the term "Polyamide" (abbreviated to: PA) is a generic term comprising homopolyamides and copolyamides. The nomenclature and abbreviations used here for polyamides and monomers thereof correspond to those established in the ISO Standard 16396-1 (2015(D)). The abbreviations used in that standard are hereinafter used synonymously with the IUPAC names of the monomers, and in particular the following abbreviations are used for monomers: MACM for bis(4-amino-3-methyl-cyclohexyl)methane (also termed 3,3'-dimethyl-4,4'-diaminodicyclohexylmethane, CAS No. 6864-37-5), PACM for bis(4-amino-cyclohexyl)methane (also termed 4,4'-diaminodicyclohexylmethane, CAS No. 1761-71-3), TMDC for bis(4-amino-3,5-dimethylcyclohexyl)methane (also termed 3,3',5,5'-tetramethyl-4,4'-diaminodicyclohexylmethane, CAS No. 65962-45-0), T for terephthalic acid (CAS No. 100-21-0), and I for isophthalic acid (CAS No. 121-95-5).

Unlike semicrystalline polyamides, amorphous polyamides exhibit no, or only very little, hardly detectable, enthalpy of fusion. In differential scanning calorimetry (DSC) in accordance with ISO 11357 (2013) at a heating rate of 20 K/min, the amorphous polyamides preferably exhibit an enthalpy of fusion of at most 5 J/g, particularly at most 3 J/g, very particularly 0 to 1 J/g. Because of their amorphous nature, amorphous polyamides have no melting point.

For the purposes of the present invention, semicrystalline polyamides are polyamides which in differential scanning calorimetry (DSC) in accordance with ISO 11357 (2013) at a heating rate of 20 K/min, preferably exhibit an enthalpy of fusion of at least 5 J/g, particularly more than 25 J/g, very particularly 30 J/g.

The C/N ratio of the respective polyamides is calculated from the entirety of the carbon atoms (C) in the monomers of which the polyamides are composed, i.e. the dicarboxylic acids, diamines and also optionally lactams and aminocarboxylic acids, in relation to the entirety of nitrogen atoms (N) in these monomers which can react in the polyamide to give amide bonds. If a polyamide comprises a plurality of polyamide units, an example being PA 11/913 (30:70 mol %), which comprises the PA units "11" and "913", the C/N ratios of the individual PA units are weighted in accordance with their molar proportion in the polyamide. The result for the example PA 11/913 (30:70 mol %) is therefore a C/N ratio of (0.3*11)+0.7*(9+13)/2=11.

According to a first preferred embodiment, the moulding composition is characterized in that the proportion of component (A) present is 32-94.4 percent by weight, preferably in the range 44.5-69.0 percent by weight.

It is preferable that component (A) consists of two components, namely:

(A1) 20-100 percent by weight, preferably 40-60 percent by weight, of at least one aliphatic semicrystalline polyamide based on acyclic dicarboxylic acids and on acyclic diamines and/or of at least one semiaromatic semicrystalline polyamide based on dicarboxylic acids and on diamines;

(A2) 0-80 percent by weight, preferably 40-60 percent by weight, of at least one amorphous semiaromatic polyamide and/or of at least one cycloaliphatic, preferably amorphous polyamide, wherein the percentage by weight of components (A1) and (A2) together provide 100% by weight of component (A).

The C:N ratio of at least one, or all, of the polyamides of component (A1) is preferably at least 8, preferably at least 8 to 12, preferably at least 9, preferably at least 9 to 11, with particular preference precisely 9. The C:N ratio of the polyamides of component (A2) can also be at least 8, preferably at least 9, with particular preference precisely 9.

(A1) is particularly preferably selected as at least one aliphatic semicrystalline polyamide, preferably based on acyclic dicarboxylic acids and on acyclic diamines, with particular preference based on acyclic dicarboxylic acids having 6 to 10 carbon atoms and on acyclic diamines having 10 to 16 carbon atoms, where (A) is free from semiaromatic semicrystalline polyamides based on dicarboxylic acids and on diamines.

The polyamides of component (A1) are preferably of the type AABB, is e composed of dicarboxylic acids and of diamines, with additionally also the possibility of presence of a subordinate proportion of lactams and amino acids as components.

The following monomers can be used by way of example as diamines for component (A1): 1,4-butanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,7-heptanediamine, 1,8-octanediamine, 2-methyl-1; 8 octanediamine, 1,9-nonanediamine, 1,10-decanediamine, 1,11-undecanediamine, 1,12-dodecanediamine, 1,13-tridecanediamine, 1,14-tetradecanediamine, m-xylylenediamine and p-xylylenediamine, preference being given here to 1,6-hexanediamine, 1,10-decanediamine and 1,12-dodecanediamine.

The following monomers can be used by way of example as dicarboxylic acids for component (A1) adipic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, C36-dimer fatty acid, cis- and/or trans-cyclohexane-1,4-dicarboxylic acid and/or cis- and/or trans-cyolohexane-1,3-dicarboxylic acid (CHDA), terephthalic acid, isophthalic acid, naphthalenedicarboxylic acid, in particular 1,5-naphthalenedicarboxylic acid and 2,6-naphthalenedicarboxylic acid, and mixtures thereof. Preference is given to adipic acid, sebacic acid, tetradecanedioic acid, hexadecanedioic acid and dodecanedioic acid.

The polyamides (A) can moreover also comprise lactams or aminocarboxylic acids, in particular α,ω-amino acids or lactams having 6 to 12 carbon atoms, and the following selection may be mentioned here by way of example: m-aminobenzoic acid, p-aminobenzoic acid, caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL) and α,ω-aminododecanoic acid (ADA). Particular preference is given to caprolactam, aminocaproic acid, α,ω-aminoundecanoic acid, laurolactam and α,ω-aminododecanoic acid. However, the proportion of these lactams and, respectively, amino acids is preferably below 50 percent by weight, based on the total weight of the polyamide (A1), with particular preference less than 20 percent by weight, particularly preferably less than ten percent by weight.

It is preferable that the semicrystalline aliphatic polyamides of component (A1) are selected from the group consisting of: PA 46, 66, 66/6, 69, 610, 612, 614, 616, 618, 810, 1010, 1012, 1212, 11, 12, 6/12, 66/6/610, preference being given here to 612, 614 and 616.

It is preferable that the semicrystalline semiaromatic polyamides of component (A1) are selected from the group consisting of: PA 6T/6I, 6T/66, 6T/6I/66, 6T/610, 6T/612, 6T/614, 6T/616, 9T, 9MT (M=2-methyloctane-1,8-diamine), 10T, 12T, 10T/6T, 11/10T, 12/10T, 11/9T, 12/9T, 10T/1010, 10T/612, where the proportion of terephthalic acid, based on the entire content of dicarboxylic acids, is preferably above 30 mol %, with particular preference above 50 mol %.

It is preferable that the melting point of the polyamides of component (A1) is at least 170° C., preferably in the range 180-340° C. or, preferably if these are aliphatic, in the range 180-230° C.

It is further preferable that the relative viscosity of the polyamides of component (A), of (A1), of (A2), or of (A1) and (A2), measured in m-cresol (0.5% by weight, 20° C.), is in the range 1.4 to 3.0, preferably in the range 1.45 to 2.70, in particular in the range 1.50 to 2.40. The cycloaliphatic polyamides of component (A2) are preferably selected from the group consisting of MACM12/PACM12, MACM14/PACM14, MACM16/PACM16, MACM18/PACM18, 6F6T/MACMI/MACMT/12, 6I/6T/612/MACMI/MACMT/MACM12, 6I/6T/614/MACMI/MACMT/MACM14, 6I/6T/616/MACMI/MACMT/MACM16, 6I/MACMI/MACMT, 6I/PACMI/PACMT, MACMI/MACMT/12, 6F6T/MACMI, MACMI/MACM36, 12/PACMI, 12/MACMT, 6I/PACMT, 6/IPDT, MACM10, MACM12, MACM14, MACM16, MACM18, MACMI/12, PACM10, PACM12, MACM14, PACM16, PACM18, PACMI/12, TMDC10, TMDC12, TMDC16, TMDC18, MACMT/MACMI/12, PACMT/PACMI/12, and mixtures thereof.

The amorphous semiaromatic polyamides of (A2) are preferably selected from the group consisting of MXDI, MXDI/6I, MXD6/MXDI, 6I, 6/6I 6T/6I, 10T/10I, 3-6T (3–6=2,2,4- or 2,4,4-trimethylhexanediamine) and mixtures thereof, where the systems 6T/6I or 10T/10I comprise a proportion below 50 mol % of 6T or 10T units, and where preference is given to a 6T:6I and, respectively, 10T/10I composition range of 20:80 to 45:55, in particular 25:75 to 40:60.

The diamines for the cycloaliphatic polyamides of component (A2) here are preferably selected from the group consisting of bis(4-amino-3-methylcyclohexyl)methane (MACM), bis(4-aminocyclohexyl)methane (PACM), bis(4-amino-3-ethylcyclohexyl)methane (EACM), bis(4-amino-3,5-dimethylcyclohexyl)methane (TMDC), 2,6-norbornanediamine (2,6-bis(aminomethyl)norbornane), 1,3-diaminocyclohexane, 1,4-diaminocyclohexanediamin, isophoronediamine, 1,3-bis(aminomethyl)cyclohexane, 1,4-bis(aminomethyl)cyclohexane, 2,2-(4,4'-diaminodicyclohexyl)propane, meta-xylylenediamine, para xylylenediamine and mixtures thereof. Particular preference is given to the diamines selected from the group consisting of bis(4-amino-3-methylcyclohexyl)methane (MACM) and bis(4-aminocyclohexyl)methane (PACM) and mixtures thereof.

Dicarboxylic acids for the cycloaliphatic polyamides component (A2) are preferably selected from the group consisting of terephthalic acid, isophthalic acid, naphthalenedicarboxylic acids (NDA), in particular 1,5-naphthalenedicarboxylic acid and 2,6-naphthalenedicarboxylic acid, 1,6-hexanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,16-hexadecanedioic acid, 1,18-octadecanedioic acid, and mixtures thereof particular preference is given to 1,6-hexanedioic acid, 1,10-decanedioic acid, 1,12-dodecanedioic acid, terephthalic acid, isophthalic acid and mixtures thereof capro- and laurolactam are moreover preferred monomers for the production of the cycloaliphatic polyamides of component (A2).

The glass transition temperature Tg of the polyamides of component (A2) is preferably above 90° C., preferably above 110° C., with particular preference above 120° C.

According to the invention, the moulding composition comprises, alongside the polyamide matrix, a certain proportion of polyethyleneimine as component (B). The proportion of component (B) is preferably in the range 0.5-4.0 percent by weight, with preference in the range 0.8-3.5 percent by weight in the moulding composition.

For the purposes of the present invention, polyethyleneimines (PEI) are polymers comprising, in their main chains, NH or N groups respectively separated from one another by two methylene groups, and as described by way of example in Encycl. Polym. Sci. Eng. 1, 680-739. Both homopolymers and copolymers, and also derivatives of these, are comprised for the purposes of the invention. It is preferable to use branched polyethyleneimines.

The homopolymers are generally obtainable via polymerization of ethylenimine (aziridine) in aqueous or organic solution in the presence of Lewis acids, other acids, or compounds that cleave to give acids. These homopolymers are branched polymers which generally comprise primary, secondary and tertiary amino groups in the ratio about 30%:40%:30%. The distribution of the amino groups determined by means of $^{13}$C-NMR spectroscopy is preferably, in terms of the primary:secondary:tertiary amino group ratio, in the range 1:0.7:0.5 to 1:1,5:1, in particular 1:0.8:0.6 to 1:1.2:0.8.

Compounds used as comonomers are preferably those having at least two amino functions. Examples that may be mentioned as suitable comonomers are alkylenediamines having 2 to 10 carbon atoms in the alkylene moiety, preferably ethylenediamine and propylenediamine. Other suitable comonomers are diethylenetriamine, triethylenetetramine, tetraethylenepentamine, dipropylenetriamine, tripropylenetriamine, diehexamethylenetriamine, aminopropylethylenediamine and bisaminopropylethylendiamine.

Equally suitable polyethyleneimines (PEI) for the purposes of the invention are amidated polymers, these usually being obtainable via reaction of polyethyleneimines (PEI) with carboxylic acids, or their esters or anhydrides, or carboxamides or acyl halides.

Alkoxylated polyethyleneimines (PEI) are moreover suitable and can be way of example be obtained via reaction of polyethyleneimine (PEI) with ethylene oxide and/or propylene oxide. Polymers thus alkoxylated can then be crosslinked.

The following may be mentioned as other suitable polyethyleneimines (PEI) of the invention: hydroxylated polyethyleneimines (PEI) and amphoteric polyethyleneimines (PEI) (incorporation of anionic groups) and also lipophilic polyethyleneimines (PEI), these generally being obtained via incorporation of long-chain hydrocarbon moieties into the polymer chain.

The molecular weight (weight average) Mw of polyethyleneimines is usually 600 to 3 000 000, preferably 700 to 2 000 000. The preferred Mw is 800 to 50 000, in particular from 1 100 to 25 000. Weight-average molecular weight Mw is determined by means of light scattering in accordance with ASTM D4001.

The polyethyleneimine of component (B) can be a branched polyethyleneimine with number-average molar mass Mn in the range 500 to 50 000 or 500 to 25 000 g/mol, preferably in the range 1000 to 2500 or 600 to 2000 g/mol.

The polyethyleneimine of component (B) is preferably a branched polyethyleneimine preferably having a ratio of primary to secondary amines in the range 1:2-2:1, preferably in the range 1.2:1-1:1.2 and/or a ratio of primary to tertiary amines in the range 3:1-1:1, preferably in the range 2:1-1.4:1, and/or a ratio of secondary to tertiary amines in the range 3:1-1:1, preferably in the range 2:1-1.2:1.

It is preferable that the polyethyleneimine of component (B) is a branched polyethyleneimine with content of primary terminal amino groups in the range 5000-20 000 µeq/g (mmol/kg), preferably in the range 7 000-12 000 µeq/g (mmol/kg).

It is also preferable that the polyethyleneimine of component (B) is a branched polyethyleneimine with water content below 4 percent by weight, preferably below 3 percent by weight, with particular preference below 2 percent by weight.

The moulding composition proposed can additionally comprise, alongside the polyamide and the polyethyleneimine, additional substances in the form of fillers and/or reinforcing materials, and specifically as component (C). The proportion of component (C) present is preferably in the range 5-60 percent by weight, preferably in the range 30-50 percent by weight.

Component (C) here more preferably comprises, or consists of:

(C1) 0-40 percent by weight, preferably 3-25 percent by weight, with particular preference 5-15 percent by weight, of particulate filler, with particular preference selected from the group consisting of: carbon black, talc, mica, silicates, quartz, wollastonite, kaolin, silicas, magnesium carbonate, magnesium hydroxide, chalk, ground or precipitated calcium carbonate, limestone, feldspar, inorganic pigments, inclusive of barium sulfate, zinc oxide, zinc sulfide, lithopone, titanium dioxide (rutile, anatase), iron oxide, iron manganese oxide, metal oxides, in particular spinel, inclusive of copper iron spinel, copper chromium oxide, zinc iron oxide, cobalt chromium oxide, cobalt aluminium oxide, magnesium aluminium oxide, mixed copper chromium magnesium oxides, mixed copper manganese iron oxides, rutile pigments inclusive of titanium zinc rutile, nickel antimony titanate, chromium antimony titanate, magnetically hard and magnetically soft metals and alloys and ceramics, hollow-sphere silicate fillers, aluminium oxide, boron nitride, boron carbide, aluminium nitride, calcium fluoride and mixtures thereof;

(C2) 60-100 percent by weight, preferably 75-97 percent by weight, with particular preference 85-95 percent by weight, of fibrous reinforcing material preferably selected from the group consisting of: glass fibres, carbon fibres, graphite fibres, aramid fibres, nanotubes and mixtures thereof, where the fibres of component (C2) can have circular or non-circular cross section, wherein the percentages by weight of components (C1) and (C2) together provide 100 percent by weight of component (C).

The ratio of the fibrous additional substances (C2) to the particulate additional substances (C1) is moreover preferably in the range 10:1 to 1:1.5 or in the range 8:1 to 1:1.

Fillers C1 can also have been surface-treated.

The median particle size (D50) of component (C1) is preferably in the range 0.1-80 µm, preferably in the range 0.2-60 µm, in particular in the range 10-60 µm. Preference is given to a shape of the particulate fillers where the aspect ratios L/b1 and L/b2 are both at most 10, in particular at most 5, where the aspect ratios are described via the quotients calculated from greatest length L of the particle to average width b1 or b2 of the particle. b1 and b2 here are arranged perpendicularly to one another in a plane perpendicular to the length L.

It is moreover preferable that the absorption coefficient of component (C1) for UV, VIS or IR radiation, in particular for laser radiation, preferably at a wavelength in the region of 1064 nm, differs from 0, preferably with absorption in the visible and/or infrared region with absorption coefficient at least 0.05, preferably at least 0.1, and with particular preference at least 0.2.

It is particularly preferable to use inorganic white pigments or carbon black as component (C1), and also mica for improved surface properties. In particular, it is preferable that component (C1) is composed exclusively of these constituents, preferably exclusively of carbon black and mica.

Component (C2) is preferably a glass fibre composed in essence, or essentially consisting, of the components silicon dioxide, calcium oxide, magnesium oxide and aluminium oxide, the $SiO_2/(CaO+MgO)$ ratio by weight being below 2.7, preferably being below 2.5 and in particular being between 2.1 and 2.4. In particular, component C2 is an E glass fibre in accordance with ASTM D578-00.

According to the invention, the glass fibre (component C2) can also be a high-strength glass fibre preferably based on the ternary system silicon dioxide-aluminium oxide-magnesium oxide or on the quaternary system silicon dioxide-aluminium oxide-magnesium oxide-calcium oxide, preference being given to a composition of 58-70% by weight of silicon dioxide ($SiO_2$), 15-30% by weight of aluminium oxide ($Al_2O_3$), 5-15% by weight of magnesium oxide (MgO), 0-10% by weight of calcium oxide (CaO) and 0-2% by weight of other oxides, e.g. zirconium dioxide ($ZrO_2$), boron oxide ($B_2O_3$), titanium dioxide ($TiO_2$) or lithium oxide ($Li_2O$). The high-strength glass fibre preferably has tensile strength greater than or equal to 4000 MPa and/or elongation at break at least 5% and tensile modulus of elasticity above 80 GPa. Specific examples of these high-strength glass fibres of component (C2) are S glass fibres from Owens Corning with 910 or 995 size, T glass fibres from Nittobo, HiPertex of 3B, HS4-glass fibres of Sinoma Jinjing Fiberglass, R-glass fibres of Vetrotex and also S-1 and S-2-glass fibres of AGY.

The glass fibres of component (C2) can be short fibres, preferably in the form of chopped glass with length in the range 0.2 to 20 mm, or can be continuous fibres (rovings). The glass fibres of component (C2) of the invention preferably have a circular or non-circular cross section.

The diameter of glass fibres with circular cross section, i.e. round glass fibres, is typically in the range 5-20 µm, preferably in the range 6-17 µm and particularly preferably in the range 6-13 µm. They are preferably used in the form of short glass fibres (chopped glass with length 0.2 to 20 mm, preferably 2-12 mm).

The dimensional ratio of the primary cross-sectional access to the secondary cross-sectional access perpendicular thereto for flat glass fibres of component (C2), i.e. glass fibres with non-circular cross section, is preferably above 2, preferably 2 to 8, in particular 2 to 5. The cross section of these (flat) glass fibres is oval, elliptical, elliptical with narrowing(s) ("cocoon" fibre), polygonal, rectangular or approximately rectangular. Another characterizing feature of the flat glass fibres used is that the length of the primary cross-sectional axis is preferably in the range 6 to 40 µm, in particular in the range 15 to 30 µm, and the length of the secondary cross-sectional axis is from 3 to 20 µm, in particular in the range 4 to 10 µm. The flat glass fibres here have maximized packing density, i.e. the extent to which the cross section of the glass fibre fills an imaginary rectangle surrounding the cross section of the glass fibre as precisely as possible is at least 70%, preferably at least 80% and with particular preference at least 85%.

Mixtures of glass fibres with circular and non-circular cross section can also be used to reinforce the moulding compositions of the invention; the flat glass fibres preferably predominate here, therefore making up more than 50% by weight of the total mass of the fibres.

The glass fibres of the invention preferably comprise a size suitable for the respective thermoplastic, in particular for polyamide, for example comprising a coupling agent based on an amino- or epoxysilane compound.

The preferred diameter of E glass fibres or high-strength glass fibres used as roving according to another preferred embodiment within component 2 is 8 to 20 µm, preferably 12 to 18 µm, where the cross section of the glass fibres can be round, oval, elliptical, elliptical with narrowing(s), polygonal, rectangular or approximately rectangular. Particular preference is given to "flat glass fibres" where the ratio of the cross-sectional axes is 2 to 5. These continuous fibres, particularly preferred within component (C2), are incorporated into the polyamide moulding compositions of the invention by known processes for the production of elongate long-fibre-reinforced granulate (fibre length and granulate length being identical), in particular by pultrusion processes where the continuous fibre strand (roving) is completely saturated with the polymer melt and then cooled and chopped. The elongate long-fibre-reinforced granulate thus obtained, preferably with length 3 to 25 mm, in particular 4 to 12 mm, can be further processed by the usual processing methods (e.g. injection moulding, compression moulding) to give mouldings. It is also possible to use continuous fibres (long glass fibres) in combination with chopped fibres (short glass fibres) to reinforce the moulding compositions of the invention.

Finally, the moulding composition proposed can also comprise additives as component (D). The proportion present of component (D) is preferably in the range 0.1-4.0 percent by weight, preferably 0.2-2.0 percent by weight.

The additives of component (D) can be selected from the group consisting of: ageing retarders, antioxidants, antiozonants, light stabilizers, UV stabilizers, UV absorbers, UV blockers, inorganic heat stabilizers, in particular based on copper halides and on alkali metal halides, organic heat stabilizers, other stabilizers, conductivity additives, optical brighteners, processing aids, nucleating agents, crystallization accelerators, crystallization retarders, flow promoters, lubricants, mould-release agents, plasticizers, organic pigments and dyes, marking materials and mixtures thereof.

In a preferred embodiment, the thermoplastic polyamide moulding composition of the invention consists of:
(A) 44.5-69.0 percent by weight of component (A) consisting of:
   (A1) 20-100 percent by weight, preferably 40-60 percent by weight, of at least one aliphatic semicrystalline polyamide based on acyclic dicarboxylic acids and on acyclic diamines with C:N ratio at least 8, at least 9 or precisely 9;
   (A2) 0-80 percent by weight, preferably 40-60 percent by weight, of at least one amorphous semiaromatic polyamide and/or of at least one cycloaliphatic polyamide,
   wherein the percentage by weight of components (A1) and (A2) together provide 100% by weight of component (A);
(B) 0.8-3.5 percent by weight of polyethyleneimine (PEI);
(C) 30-50 percent by weight of fillers and/or reinforcing materials;
(D) 0.2-2.0 percent by weight of additives;
where the entirety of (A)-(D) provides 100% of the thermoplastic polyamide moulding composition.

In another preferred embodiment, the thermoplastic polyamide moulding composition of the invention consists of:
(A) 44.5-69.0 percent by weight of component (A) consisting of:
   (A1) 40-60 percent by weight of at least one aliphatic semicrystalline polyamide selected from the group consisting of: 612, 614, 616 and mixtures thereof;
   (A2) 40-60 percent by weight of at least one amorphous semiaromatic polyamide selected from the group consisting of: 6T/6I and/or 10T/10I, respectively with a proportion below 50 mol % of 6T and, respectively, 10T units, and/or at least one cycloaliphatic polyamide selected from the group consisting of: MACM12, PACM12, MACM12/PACM12, MACM14, MACM16 and mixtures thereof,
   where the percentages by weight of components (A1) and (A2) provide a total of 100% by weight of component (A);
(B) 0.8-3.5 percent by weight of polyethyleneimine (PEI);
(C) 30-50 percent by weight of fillers and/or reinforcing materials;
(D) 0.2-2.0 percent by weight of additives;
where the entirety of (A)-(D) provides 100% of the thermoplastic polyamide moulding composition.

In another preferred embodiment, the thermoplastic polyamide moulding composition of the invention consists of:
(A) 32-94.4 percent by weight, preferably 44.5-69.0 percent by weight, of a mixture consisting of:
   (A1) 20-100 percentage by weight, preferably 40-60 percent by weight, of at least one aliphatic semicrystalline polyamide selected from the group consisting of PA 610, PA 612, PA 614, PA 616, PA1010, PA11, PA12;
   (A2) 0-80 percent by weight, preferably 40-60 percent by weight, of at least one amorphous semiaromatic polyamide and/or at least one cycloaliphatic polyamide selected from the group consisting of PA 6I/6T, PA 10I/10T, MACM12, MACM14, MACM16;
   where the percentages by weight of components (A1) and (A2) provide a total of 100% by weight of component (A);
(B) 0.5-4.0 percent by weight, preferably 0.8-3.5 percent by weight, of polyethyleneimine (PEI) or copolymers or derivatives thereof;

(C) 5-60 percent by weight, preferably 30-50 percent by weight, of fillers and/or reinforcing materials;

(D) 0.1-4.0 percent by weight, preferably 0.2-2.0 percent by weight, of additives; where the entirety of (A)-(D) provides 100% of the thermoplastic polyamide moulding composition.

The present invention moreover provides a composite comprising at least three directly mutually adjoining layers (I)-(III) of the following type coherently bonded to one another:

(I) Layer made of a polyamide moulding composition with 0.1-5.0 percent by weight content of polyethyleneimine (PEI) or of a copolymer or derivative thereof;
(II) Polyurethane layer;
(III) Layer of mineral glass.

This composite is preferably characterized in that the layer (I) is composed of a polyamide moulding composition as described above.

The polyurethane layer (II) is preferably based on a reactive polyurethane (PU) adhesive system, preferably on a one-component polyurethane adhesive or two-component polyurethane adhesive, with particular preference based on a reactive polyurethane hot-melt adhesive, which is preferably moisture-crosslinking.

Reactive moisture-curing hot-melt adhesives are widely used in industry and, like thermoplastic hot-melt adhesives, are applied in molten form. After application, joining of the substrate parts to be bonded and cooling of the said melt, rapid physical setting of the hot-melt adhesive then occurs, due to its solidification. In the case of moisture-reactive hot-melt adhesives, this is followed by a chemical reaction of the reactive groups still present with moisture from the environment to produce a crosslinked and non-fusible adhesive.

Reactive PU hot-melt adhesives are designed so that initial strength due to solidification, and also final strength due to moisture crosslinking, are achieved as quickly as possible, so that the joined components can either be further processed or are ready for final use.

The adhesives can comprise solvents, but are preferably solvent-free. The crosslinking of the polyurethane adhesives suitable according to the invention is based on the reaction of reactive NCO groups with H-acidic functional groups, for example OH groups, amino groups or carboxy groups. In an alternative crosslinking method, the NCO groups react with moisture from the applied adhesive, the substrate, or the environment to form urea groups. These reactions can be accelerated by introducing catalysts into the adhesive, for example amine catalysts, titanium catalysts or tin catalysts.

In preferred embodiments, the adhesive is a one-component polyurethane adhesive. This can comprise at least one NCO-terminated polyurethane prepolymer as resin component, and cures via reaction of the NCO groups with moisture from the adhesive applied, the substrate, or the environment.

The isocyanate (NCO)-terminated polyurethane prepolymers of the resin component are obtained via reaction of a polyol or polyol mixture with stoichiometric excess of polyisocyanate. The polyols used in production of the prepolymer can be any of the polyols usually used for polyurethane synthesis, for example polyester polyols, polyether polyols, polyesterether polyols, polycarbonate polyols or a mixture of two or more of the abovementioned.

Polyether polyols can be produced from a wide variety of alcohols comprising one or more primary or secondary alcohol groups, e.g.: ethylene glycol, propylene glycol, glycerol, butanediol, butanetriol, trimethylolethane, pentaerythritol, hexanediol, 3-hydroxyphenol, hexanetriol, trimethylolpropane, octanediol, neopentylglycol, 1,4-hydroxymethylcyclohexane, bis(4-hydroxyphenyl)dimethylmethane and sorbitol. Cyclic ethers that can be used to produce the polyethers described above are alkylene oxides such as ethylene oxide, propylene oxide, butylene oxide, epichlorhydrin, styrene oxide and tetrahydrofuran and mixtures of these alkylene oxides.

Polyester polyols can by way of example be produced via reaction of low-molecular-weight alcohols, in particular ethylene glycol, diethylene glycol, neopentyl glycol, hexanediol, butanediol, propylene glycol, glycerol or trimethylolpropan with caprolactone. Polyhydric alcohols likewise suitable for producing polyester polyols are 1,4-hydroxymethylcyclohexane, 2-methyl-1,3-propanediol, 1,2,4-Butanetriol, triethylene glycol, tetraethylene glycol, polyethylene glycol, dipropylene glycol, polypropylene glycol, dibutylene glycol and polybutylene glycol. Other suitable polyester polyols can be produced via polycondensation. Dihydric and/or trihydric alcohols can be condensed with an substoichiometric quantity of dicarboxylic acids or tricarboxylic acids or with mixtures of dicarboxylic acids or tricarboxylic acids, or with reactive derivatives of these, to give polyester polyols. Examples of suitable dicarboxylic acids are adipic acid, succinic acid and dodecanedioic acid, and higher homologues having up to 16 carbon atoms, and also unsaturated dicarboxylic acids such as maleic acid and fumaric acid, and also aromatic dicarboxylic acids, in particular the isomeric phthalic acids, for example phthalic acid, isophthalic acid and terephthalic acid. Examples of suitable tricarboxylic acids are citric acid and trimellitic acid. The acids mentioned can be used individually or in the form of mixtures of two or more thereof.

Polycarbonate polyols can by way of example be obtained via reaction of diols, for example propylene glycol, 1,4-butanediol or 1,6-hexanediol, diethylene glycol, triethylene glycol or tetraethylene glycol, or a mixture of these diols with diaryl carbonates, for example diphenyl carbonates, or phosgene.

The molar mass of the polyols used to synthesize the prepolymer is preferably in the range 100 to 20 000 g/mol, in particular 300 to 5 000 g/mol. Average functionality can be in the range 2 to 4.5. The PU prepolymer preferably has a polyether/polyester backbone.

The stoichiometric excess of polyisocyanate, based on the molar ratio of NCO groups to OH groups, is in particular 1:1 to 2.5:1, preferably 1:1 to 2:1 and particularly preferably 1.05:1 to 1.8:1.

Polyisocyanates that can be used are polyisocyanates having two or more isocyanate groups. Examples of suitable polyisocyanates are naphthylene 1,5-diisocyanate (NDI), diphenylmethane 2,4- or 4,4'-diisocyanate (MDI), hydrogenated MDI (H12MDI), xylylene diisocyanate (XDI), tetramethylxylylene diisocyanate (TMXDI), and tetraalkylene diphenylmethane diisocyanate, dibenzyl 4,4'-diisocyanate, phenylene 1,3- or 1,4-diisocyanate, tolylene diisocyanate (TDI), 1-methyl-2,4-diisocyanatocyclohexane, 1,6-diisocyanato-2,2,4-trimethylhexane, 1, 6-diisocyanato-2,4,4-trimethylhexane, 1-Isocyanatomethyl-3-isocyanato-1,5,5-trimethylcyclohexane (IPDI), tetramethoxybutane 1,4-diisocyanate, butane 1,4-diisocyanate, hexane 1,6-diisocyanate (HOI), dicyclohexylmethanediisocyanate, cyclohexane 1,4-diisocyanate, ethylene diisocyanate, methylenetriphenyl triisocyanate (MIT), bisisocyanatoethyl phthalate, trimethylhexamethyl ene diisocyanate, 1,4-diisocyanatobutane, 1,12-diisocyanatododecane and dimer fatty acid diisocyanate.

Suitable at least trifunctional isocyanates are polyisocyanates produced via trimerization or oligomerization of diisocyanates or via reaction of diisocyanates with low-molecular-weight polyfunctional compounds comprising hydroxy or amino groups. Commercially obtainable examples are trimerization products of the isocyanates HOI, MDI or IPDI or adducts of diisocyanates and of low-molecular-weight triols, for example trimethylolpropane or glycerol. Other examples are isocyanurates of hexamethylene diisocyanate (HOI) and isocyanurates of isophorone diisocyanate (IPDI).

Aliphatic, cycloaliphatic or aromatic isocyanates can be used, but in particular aromatic diisocyanates are suitable because of their reactivity. Examples of suitable diisocyanates are methylenediphenyl diisocyanates (MDI), for example methylendiphenyl 4,4'-diisocyanate, methylendiphenyl 2,4'-diisocyanate or methylenediphenyl 2,2'-diisocyanate.

PU prepolymers can be produced in a known manner from the abovementioned polyols and the polyisocyanates. The polyols and the isocyanates here can be used to produce a prepolymer comprising NCO groups. Examples of these are described in EP-A951493, EPA1341832, EP-A 150444, EP-A 1456265, WO 2005/097861. The PU prepolymers are preferably an aromatic-isocyanate-terminated, more preferably MDI-terminated, polyurethane prepolymer made from a polyester polyol mixture and from an aromatic diisocyanate, for example MDI.

The NCO content of the corresponding prepolymers is usually 0.25 to 5.0% by weight (determined in accordance with DIN EN ISO 11909:2007-05), preferably 0.25 to 4.0% by weight; their average NCO functionality is 2 to 3, in particular 2.

The molar mass (Mn) of the prepolymer is in the range 300 to 20 000 g/mol, preferably below 12 000, in particular below 8000 g/mol.

The adhesive systems described preferably comprise quantities of 50 to 99% by weight of the prepolymers described above, more preferably 75 to 98% by weight, based on the total weight of the adhesive composition. The hot-melt adhesives can moreover comprise at least one other thermoplastic polymer, in particular a thermoplastic polyester. The number-average molar mass of the thermoplastic polyester here is preferably below 6000 g/mol.

The adhesive of the invention can moreover comprise the usual additives. The other constituents are by way of example tackifiers, adhesion promoters, crosslinking agents or viscosity regulators, pigments, plasticizers, stabilizers and/or catalysts, waxes or antioxidants. The adhesive can comprise a total of up to 25% by weight of the additives.

Suitable polyurethane adhesive systems of this type are obtainable in the form of "H.B. Fuller PU reactive hot melt" systems from H.B. Fuller, USA.

The polyurethane layer (II) can therefore preferably be configured on the basis of a one-component polyurethane hot-melt adhesive system that is moisture-crosslinking.

It is preferable that the polyurethane layer (II) is based on a crosslinked system, with preference a chemically and/or physically crosslinked system, in particular a moisture-crosslinked or electromagnetically crosslinked system.

The layer (III) of the composite is a mineral glass.

In a preferred embodiment, the refractive index of the mineral glass is 1.50 to 1.53, and the glass is preferably based on the ternary system silicon dioxide-aluminium oxide-magnesium oxide or on the quaternary system silicon dioxide-aluminium oxide-magnesium oxide-calcium oxide, preference being given here to a composition of 58 to 70% by weight of silicon dioxide ($SiO_2$), 15 to 30% by weight of aluminium oxide ($Al_2O_3$), 5 to 15% by weight of magnesium oxide (MgO), 0 to 10% by weight of calcium oxide (CaO) and 0 to 7% by weight of other oxides, e.g. zirconium dioxide ($ZrO_2$), boron oxide ($B_2O_3$), titanium dioxide ($TiO_2$), iron oxide ($Fe_2O_3$), sodium oxide, potassium oxide or lithium oxide ($Li_2O$).

In particular, the material is protective covering glass for touchscreens of portable electronic devices. Particular preference is given to Gorilla Glass (Corning, USA), a thin chemically prestressed glass from the alkali metal aluminosilicate glasses group. This glass with preferred thickness between 0.4 and 2 mm features high resistance to fracture and to scratching. This is achieved by using an ion-exchange procedure in a potassium-salt melt at about 400° C. to replace sodium ions with potassium ions in the glass layers close to the surface and thus introduce a superficial compressive stress that inhibits crack propagation. Whereas normal glass exhibits cracking under a point load of 5 Newtons, in the case of Gorilla Glass this does not occur until loads in excess of 40 Newtons. Similar behaviour is observed in relation to scratch resistance. According to information from the manufacturer, scratch resistance of the product is about two to three times that of conventional glass. Similar glasses are marketed by Asahi Glass and, respectively Schott with trademark Dragontrail or Xensation Cover. These two products likewise consist of alkali metal alumosilicate glass.

The present invention further provides the use of a thermoplastic moulding composition as described above for the production of a composite of this type.

The present invention moreover provides a process for the production of a composite of this type, where a polyamide is mixed with a polyethyleneimine (PEI) or with a copolymer or derivative thereof, and also optionally with fibrous reinforcing materials and additional particulate materials, preferably to give a polyamide as described above, this material is processed in an injection-moulding process or extrusion process to give a moulding, and this moulding is brought into contact as layer (I), by way of a layer (II) of polyurethane adhesive, with a layer (III) made of mineral glass, and then the layer (II) is hardened, preferably in that the layer (II) is crosslinked, preferably with exposure to moisture and/or exposure to electromagnetic waves.

Finally, the present invention provides the use of polyethyleneimine (PEI) or of a copolymer or derivative thereof in a polyamide moulding composition to improve adhesion to polyurethane, preferably for information of a composite as described above. Here again, the proportion of the polyethyleneimine present in the polyamide moulding composition is preferably in the range 0.5-4.0 percent by weight, with preference in the range 0.8-3.5 percent by weight in the moulding composition, based on the total weight of the polyamide moulding composition, and the polyethyleneimine is preferably a branched polyethyleneimine with a ratio of primary to secondary amines preferably in the range 1:2-2:1, preferably in the range 1.2:1-1:1.2 and/or a ratio of primary to tertiary amines in the range 3:1-1:1, preferably in the range 2:1-1.4:1 and/or a ratio of secondary to tertiary amines in the range 3:1-1:1, preferably in the range 2:1-1.2:1.

The polyethyleneimine is more preferably a branched polyethyleneimine with number-average molar mass $M_n$ in the range 500-50 000 or 500-25 000 g/mol, preferably in the range 600-2000 or 1000-2500 g/mol.

The polyethyleneimine can preferably have the further other properties already described at an earlier stage above in connection with the thermoplastic polyamide moulding composition.

The dependent claims provide further embodiments.

BRIEF DESCRIPTION OF THE DRAWINGS

Preferred embodiments of the invention are described below with reference to the drawings, which serve merely for illustration and are not to be interpreted as restrictive.

DESCRIPTION OF PREFERRED EMBODIMENTS

The components stated in Table 1 were compounded in the proportions stated in Tables 2 and 3 in an twin-screw extruder from Werner and Pfleiderer with screw diameter 25 mm with prescribed process parameters (see Table 4); the polyamide granulates and the added substances were metered here into the feed zone, whereas the glass fibre was metered into the polymer melt by way of a side-feeder 3 barrel sections before the die. The compounded materials collated in Tables 2 and 3 were drawn off as strand from a die with diameter 3 mm and granulated after water-cooling. The granulate was dried in vacuo at 30 mbar for 24 hours at 100° C.

TABLE 1

Materials used in the Inventive Examples and Comparative Examples

| Components | Description | Manufacturer |
|---|---|---|
| Polyamide 1 | PA 612, $\eta_{rel.}$ = 1.78, Tm = 215° C., AG = 21 µeq/g | EMS-CHEMIE AG |
| Polyamide 1A | PA 612, $\eta_{rel.}$ = 1.45, AG = 210 µeq/g | EMS-CHEMIE AG |
| Polyamide 2 | PA 616, $\eta_{rel.}$ = 1.94, Tm = 195° C., AG = 32 µeq/g | EMS-CHEMIE AG |
| Polyamide 3 | PA 6I/6T (67:33), $\eta_{rel.}$ = 1.52, $T_g$ = 125° C., AG = 45 µeq/g | EMS-CHEMIE AG |
| Polyamide 4 | PA 6I/6T (67:33), $\eta_{rel.}$ = 1.41, $T_g$ = 122° C., AG = 287 µeq/g | EMS-CHEMIE AG |
| Polyamide 5 | PA MACM16, $\eta_{rel.}$ = 1.75, $T_g$ = 140° C., AG = 34 µeq/g | EMS-CHEMIE AG |
| Polyamide 6 | PA 6, $\eta^*_{rel.}$ = 2.70 (1% in sulfuric acid), $T_m$ = 222° C., AG = 23 µeq/g | EMS-CHEMIE AG |
| Glass fibre | Vetrotex 995 EC10-4.5, E glass, diameter = 10 µm, length = 4.5 mm, round cross section | Owens Corning Fiberglass (US) |
| Carbon black | Black Pearls 1100, Iodine absorption (g/kg) 20, OAN (cc/100 g): 105 (ASTM D2414) | Cabot Corp. (CH) |
| Mica | Mica HLM 100; Muskovite mica, density: 2.8 g/cm$^3$; median diameter: 50 µm (d50), 315 µm (d98): aspect ratio: 40:1 | Kärntner Montanindustrie (AT) |
| PEI | Lupasol G20, polyethyleneimine (CAS 25987-06-8). number-average molar mass $M_n$ = 1200 g/mol, water content at most 2 percent by weight, ratio of primary/secondary/tertiary amines 1:0.91:0.64 | BASF SE (DE) |
| Stabilizer system | Mixture of Irganox 1010 (CAS 6683-19-8), Anox 20 (CAS 6683-19-8) and Hostanox PAR24 (CAS 31570-04-4) in the ratio 7:3:3 | BASF SE Addivant Clariant Int. Ltd. |
| $\eta_{rel}$ | Relative viscosity determined in accordance with ISO 306. 0.5 g polymer granulate in 100 ml m-cresol, 20° C. for polyamides 1 to 5 | |
| $\eta^*_{rel}$ | Relative viscosity determined in accordance with ISO 306, sulfuric acid, 1.0% by weight, 20° C., for polyamide 6 | |
| AG | Concentration of terminal amino groups in [µeq/g] | |
| $T_g$, $T_m$ | Glass transition temperature, melting point determined in accordance with ISO 11357 at heating rate 20° C./min | |

TABLE 2

Moulding compositions according to the invention

| | Unit | IE1 | IE2 | IE3 | IE4 | IE5 | IE6 | IE7 | IE8 |
|---|---|---|---|---|---|---|---|---|---|
| Components | | | | | | | | | |
| Polyamide 1 (component A1) | % by wt. | 28.79 | 28.04 | 28.99 | 57.58 | 43.20 | 28.04 | 28.04 | |
| Polyamide 2 (component A1) | % by wt. | | | | | | | | 28.79 |
| Polyamide 3 (component A2) | % by wt. | 28.79 | 28.04 | 28.99 | | 14.38 | | | |
| Polyamide 4 (component A2) | % by wt. | | | | | | 28.04 | 28.04 | |
| Polyamide 5 (component A2) | % by wt. | | | | | | | | 28.79 |
| Stabilizer | % by wt. | 0.42 | 0.42 | 0.42 | 0.42 | 0.42 | 0.42 | 0.42 | 0.42 |
| Carbon black | % by wt. | 0.50 | 0.50 | 0.50 | 0.50 | 0.50 | 0.70 | 0.50 | 0.50 |
| Mica | % by wt. | 5.00 | 5.00 | 5.00 | 5.00 | 5.00 | 4.80 | 5.00 | 5.00 |
| Glass fibre | % by wt. | 35.00 | 35.00 | 35.00 | 35.00 | 35.00 | 35.00 | 35.00 | 35.00 |
| PEI | % by wt. | 1.50 | 3.00 | 1.10 | 1.50 | 1.50 | 1.50 | 3.00 | 1.50 |
| Properties | | | | | | | | | |
| Terminal amino groups | µeq/g | 220 | 395 | 165 | 228 | 217 | 297 | 472 | 229 |
| Modulus of elasticity | MPa | 12200 | 12100 | 12200 | 12000 | 11900 | 12200 | 11800 | 11000 |
| Tensile stress at break | MPa | 181 | 170 | 176 | 180 | 176 | 180 | 167 | 152 |
| Elongation at break | % | 2.2 | 2.1 | 2.2 | 2.5 | 2.4 | 2.3 | 2.1 | 5.3 |
| Impact resistance, Charpy, 23° C. | kJ/m$^2$ | 47 | 32 | 55 | 65 | 56 | 47 | 38 | 51 |
| Notched impact resistance, Charpy, 23° C. | kJ/m$^2$ | 8 | 7 | 9 | 10 | 8 | 8 | 7 | 10 |
| Adhesion | mJ | 996 | 1013 | 915 | 654 | 915 | 1013 | 1078 | 817 |

TABLE 3

Moulding compositions of the Comparative Examples

| | Unit | CE1 | CE2 | CE3 | CE4 | CE5 |
|---|---|---|---|---|---|---|
| Components | | | | | | |
| Polyamide 1 | % by wt. | 29.54 | 59.08 | | | |
| Polyamide 1A | % by wt. | | | | 29.54 | |
| Polyamide 3 | % by wt. | 29.54 | | 59.08 | | |
| Polyamide 4 | % by wt. | | | | 29.54 | |
| Polyamide 6 | % by wt. | | | | | 67.51 |
| Stabilizer | % by wt. | 0.42 | 0.42 | 0.42 | 0.42 | 0.14 |
| Carbon black | % by wt. | 0.50 | 0.50 | 0.50 | 0.50 | |
| Mica | % by wt. | 5.00 | 5.00 | 5.00 | 5.00 | |
| Glass fibre | % by wt. | 35.00 | 35.00 | 35.00 | 35.00 | 30.0 |
| PEI | % by wt. | | | | | 2.00 |
| Calcium montanate | % by wt. | | | | | 0.35 |
| Properties | | | | | | |
| Terminal amino groups | µeq/g | 27 | 24 | 30 | 242 | 33 |
| Modulus of elasticity | MPa | 11540 | 11300 | 12000 | 12500 | 9600 |
| Tensile stress at break | MPa | 189 | 180 | 195 | 151 | 161 |
| Elongation at break | % | 3.0 | 3.5 | 2.5 | 1.1 | 2.5 |
| Impact resistance, Charpy, 23° C. | kJ/m$^2$ | 68 | 85 | 47 | 12 | 45 |
| Notched impact resistance, Charpy, 23° C. | kJ/m$^2$ | 9 | 12 | 8 | 5 | 8 |
| Adhesion | mJ | 327 | 229 | 327 | 423 | 457 |

TABLE 4

Compounding process parameters

| Parameter | Temperature profile [° C.] |
| --- | --- |
| Temperatur Zone 1 | 80-100 |
| Temperatur Zone 2 | 230-250 |
| Temperatur Zone 3 to 10 | 250-260 |
| Temperatur Zone 11 | 250-270 |
| Temperatur Zone 12 | 230-270 |
| Temperature of die head | 260-280 |
| Melt temperature | 250-280 |
| Throughput [kg/h] | 8-12 |
| Screw rotation rate [rpm] | 150-200 |

The compounded materials were injection-moulded in an Arburg Allrounder 320-210-750 injection-moulding machine at defined cylinder temperatures of 240 to 280° C. in zones 1 to 4 and with mould temperature 100° C. to give test samples.

Test Methods

The following test methods were used for the purposes of this application:

Melting Point (Tm) and Enthalpy of Fusion (ΔHm):

Melting point and enthalpy of fusion were determined in accordance with ISO 11357-3 (2013) on the granulate. The DSC (differential scanning calorimetry) measurements were made at heating rate 20 K/min.

Glass Transition Temperature, Tg:

Glass transition temperature $T_g$ was determined in accordance with ISO 11357-2 (2013) on granulate by means of differential scanning calorimetry (DSC). This was carried out with heating rate 20 K/min in each of the two heating procedures. After the first heating procedure, the specimen was quenched in dry ice. The glass transition temperature ($T_g$) was determined during the second heating procedure. The midpoint of the glass transition region, stated as glass transition temperature, was determined by the "half height" method.

Relative Viscosity, $\eta_{rel}$:

Relative viscosity was determined in accordance with ISO 307 (2007) at 20° C. For this, 0.5 g of polymer granulate was weighed into 100 ml of m-cresol (unless otherwise stated), and relative viscosity (RV) was calculated by a method based on Section 11 of the Standard as follows: $RV=t/t_0$.

Tensile Modulus of Elasticity:

Tensile modulus of elasticity was determined in accordance with ISO 527 (2012) at 23° C. with tensile velocity 1 mm/min on an ISO tensile specimen (Type A1, 170×20/10× 4) produced in accordance with the standard: ISO/CD 3167 (2003).

Tensile Stress at Break and Elongation at Break:

Tensile stress at break and elongation at break were determined in accordance with ISO 527 (2012) at 23° C. with tensile velocity 5 mm/min on a Type A1 ISO tensile specimen (170×20/10×4 mm) produced in accordance with the standard ISO/CD 3167 (2003).

Charpy Impact Resistance:

Charpy impact resistance was determined in accordance with ISO 179/2*eU (1997, *2=instrumented) at 23° C. on a Type B1 ISO test specimen (80×10×4 mm) produced in accordance with the standard ISO/CD 3167 (2003).

Charpy Notched Impact Resistance:

Charpy notched impact resistance was determined in accordance with ISO 179/2*eA (1997, *2=instrumented) at 23° C. on a Type B1 ISO test specimen (80×10×4 mm) produced in accordance with the standard ISO/CD 3167 (2003).

Figure 1A:
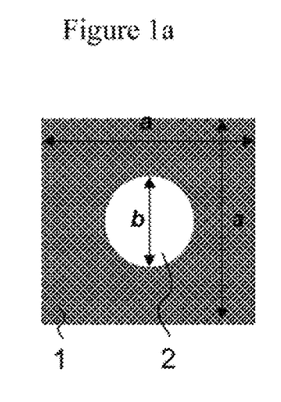
FIGS. 1a-1e in the drawing shows: the various phases of the experimental set-up for measuring adhesion.
Figure 1B:
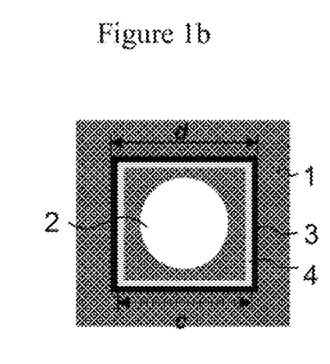
Figure 1C:
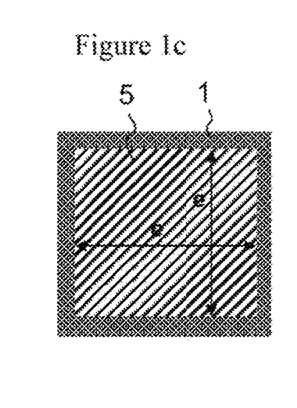
Figure 1D:
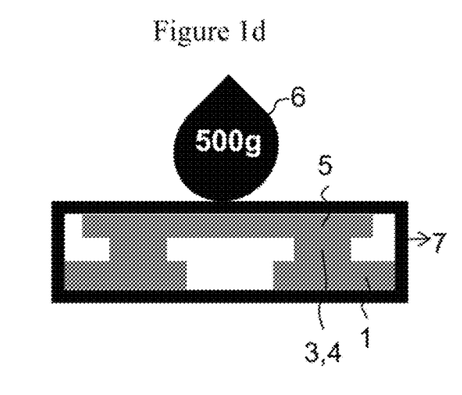

Adhesion:

The following procedure was used to measure adhesion: a square test sample 1 with side length a 50 mm and thickness 3.5 mm, and also with a central circular aperture 2 with diameter b 10 mm was produced by injection moulding as stated above (cf. FIG. 1a). An adhesive tape strip of thickness 240 μm was then used (cf. FIG. 1b) to produce a square 3 with exterior width d 17 mm and interior width c 14 mm. A strip 4 of breadth 1 mm of EH9651 PU hot-melt adhesive from H.B. Fuller was then applied while warm on the internal side of the same square, likewise at a thickness of 240 μm and then (cf. FIG. 1c) a square panel 5 of mineral glass (Gorilla Glass 5, Corning) with side length e 20 mm and thickness 3 millimetres was superposed with the aid of a template. The composite was then dried and, respectively, the PU adhesive crosslinked (cf. FIG. 1d) for 2 hours under a load 6 of 500 g at 23° and 50% relative moisture.

Figure 1E:
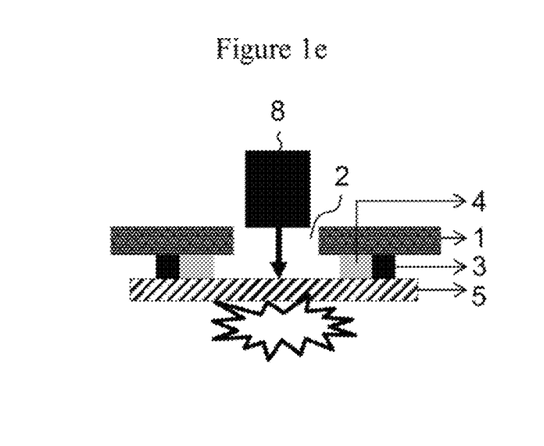

Adhesion was measured in a set-up according to FIG. 1e), where a cylindrical metallic body 8 with diameter 7 mm, weighing 50 g, 100 g, or 120-220 g, as required by each test, was dropped from increasing height in the range 50-500 mm in controlled manner through the aperture 2 onto the glass panel 5 until the composite separated; the kinetic energy of the body 8 on impact in the final damage-free drop test was taken as adhesion value.

Terminal Amino Group Concentration:

For determination of terminal amino groups, the polyamide is dissolved in m-cresol under hot conditions and isopropanol is admixed (m-cresol:isopropanol=2:1 volumetrically). Content of terminal amino groups is determined by potentiometric titration with perchloric acid.

Discussion of Results:

The measured values reveal the following: in the absence of polyethyleneimine in the polyamide matrix (cf. CE1-CE3), although good mechanical values are obtained adhesion is poor. This problem cannot be solved by using a polyamide with increased terminal amino group concentration as polyamide matrix (cf. CE4): tensile stress at break and elongation at break decrease sharply here, i.e. mechanical properties deteriorate, and no significant improvement of adhesion can be obtained.

It is moreover apparent that use of polyethyleneimine as additional material in a polyamide 6 (cf. CE6) does not lead to adequate adhesion.

In other words, good adhesion is achievable only with a polyamide matrix according to the claims with the claimed proportions of polyethyleneimine (IE1-IE7).

LIST OF REFERENCE SIGNS

1 Square polyamide test sample
2 Aperture in 1
3 Tape square
4 PU adhesive
5 Square glass panel
6 Weight
7 Template
8 Falling body
a Side length of 1
b Diameter of 2
c Interior width of 3
d External width of 3
e Side length of 5

The invention claimed is:

1. A thermoplastic polyamide moulding composition consisting of:

(A) 30-99.9 percent by weight of:

(A1) 20-100 percent by weight of at least one aliphatic semicrystalline polyamide based on acyclic dicarboxylic acids and on acyclic diamines selected from PA612, PA614, or PA616; and
(A2) 0-80 percent by weight, of a polyamide selected from the group consisting of at least one amorphous semiaromatic polyamide, at least one cycloaliphatic polyamide, or a mixture thereof,
wherein a percentage by weight of components (A1) and (A2) together provide 100% by weight of component (A);
(B) 0.1-5.0 percent by weight of at least one polyethyleneimine (PEI);
(C) 5.0-60 percent by weight of fillers and/or reinforcing materials;
(D) 0-5.0 percent by weight of additives;
where the entirety of (A)-(D) provides 100% of the thermoplastic polyamide moulding composition.

2. The moulding composition according to claim 1, wherein the proportion of component (A) present is 32-94.4 percent by weight;
or wherein the melting point of the polyamides of component (A1) is at least 170° C.;
or wherein the polyamides of component (A2) are selected from the group consisting of: the cycloaliphatic polyamides MACM12/PACM12, MACM14/PACM14, MACM16/PACM16, MACM18/PACM18, 6I/6T/MACMI/MACMT/12, 6I/MACMI/MACMT, 6I/PACMI/PACMT, 6I/6T/MACMI, 6I/6T/612/MACMI/MACMT/MACM12, MACMI/MACMT/12, 6/IPDT, 6I/6T/614/MACMI/MACMT/MACM14, 6I/6T/616/MACMI/MACMT/MACM16, MACMI/MACM36, 12/PACMI, 12/MACMT, 6I/PACMT, MACM10, MACM12, MACM14, MACM16, MACM18, MACMI/12, PACM10, PACM12, MACM14, PACM16, PACM18, PACMI/12, TMDC10, TMDC12, TMDC16, TMDC18, MACMT/MACMI/12, PACMT/PACMI/12, amorphous semiaromatic polyamides 6I, 6/6I, MXDI, MXDP6I, MXD6/MXDI, 6T/6I, 10T/10I, 3-6T and mixtures thereof, where the systems 6T/6I or 10T/10I comprise a proportion below 50 mol % of 6T or 10T units;
or wherein the glass transition temperature Tg of the polyamides of component (A2) is above 90° C.

3. The moulding composition according to claim 1, wherein the moulding composition is free from aluminium salts, is free from polyethyleneimines, configured as copolymers, and is free from iron powder.

4. The moulding composition according to claim 1, wherein the proportion present in the moulding composition of component (B) is in the range 0.5-4.0 percent by weight.

5. The moulding composition according to claim 1, wherein the polyethyleneimine of component (B) is a branched polyethyleneimine;
or wherein the polyethyleneimine of component (B) is a branched polyethyleneimine with number-average molar mass Mn in the range 500-50 000 g/mol,
or wherein the polyethyleneimine of component (B) is a branched polyethyleneimine with content of primary amino groups in the range 5000-20 000 µeq/g;
or wherein the polyethyleneimine of component (B) is a branched polyethyleneimine with water content below 4 percent by weight.

6. The moulding composition according to claim 1, wherein
component (C) consists of:
(C1) 0-40 percent by weight of particulate filler;
(C2) 60-100 percent by weight of fibrous reinforcing material,
wherein the percentages by weight of components (C1) and (C2) together provide 100 percent by weight of component (C).

7. The moulding composition according to claim 1, wherein the proportion of component (D) present is in the range 0.1-4.0 percent by weight;
or wherein the additives of component (D) are selected from the group consisting of: ageing retarders, antioxidants, antiozonants, light stabilizers, UV stabilizers, UV absorbers, UV blockers, inorganic heat stabilizers, organic heat stabilizers, other stabilizers, conductivity additives, optical brighteners, processing aids, nucleating agents, crystallization accelerators, crystallization retarders, flow promoters, lubricants, mould-release agents, plasticizers, organic pigments and dyes, marking materials and mixtures thereof.

8. A method of using a thermoplastic moulding composition according to claim 1 for the production of a composite.

9. A moulding composition according to claim 1, wherein the proportion of component (A) present is in the range 44.5-69.0 percent by weight;
or wherein component (A) consists of:
(A1) 40-60 percent by weight, of a polyamide selected from the group consisting of: at least one aliphatic semicrystalline polyamide based on acyclic dicarboxylic acids and on acyclic diamines, at least one semiaromatic semicrystalline polyamide based on dicarboxylic acids and on diamines, or mixtures thereof;
(A2) 40-60 percent by weight, of a polyamide selected from the group consisting of: at least one amorphous semiaromatic polyamide, of at least one cycloaliphatic polyamide, or a mixture thereof,
wherein the percentage by weight of components (A1) and (A2) together provide 100% by weight of component (A),
or wherein the melting point of the polyamides of component (A1) is at least in the range 180-340° C., or if the polyamides are aliphatic 180-230° C.;
or wherein the polyamides of component (A2) are selected from the group consisting of: 6T:6I, 10T/10I with a composition range of 20:80 to 45:55;
or wherein the glass transition temperature Tg of the polyamides of component (A2) is above 110° C.

10. The moulding composition according to claim 1, wherein component (A) consists of:
(A1) 20-100 percent by weight of a polyamide selected from the group consisting of: at least one aliphatic semicrystalline polyamide based on acyclic dicarboxylic acids and on acyclic diamines, at least one semiaromatic semicrystalline polyamide based on dicarboxylic acids and on diamines, or a mixture thereof;
(A2) 0-80 percent by weight, of a polyamide selected from the group consisting of: at least one amorphous semiaromatic polyamide, at least one cycloaliphatic polyamide, or a mixture thereof,
wherein the percentage by weight of components (A1) and (A2) together provide 100% by weight of component (A),
and wherein the C:N ratio of at least one, or all, of the polyamides of component (A1) is at least 8.

11. The moulding composition according to claim 1, wherein component (A) consists of:
(A1) 20-100 percent by weight of a polyamide selected from the group consisting of: at least one aliphatic semicrystalline polyamide based on acyclic dicarboxylic acids and on acyclic diamines, at least one semiaromatic semicrystalline polyamide based on dicarboxylic acids and on diamines, or a mixture thereof;

(A2) 0-80 percent by weight, of a polyamide selected from the group consisting of: at least one amorphous semiaromatic polyamide, at least one cycloaliphatic polyamide, or a mixture thereof, wherein the percentage by weight of components (A1) and (A2) together provide 100% by weight of component (A), and wherein the C:N ratio of at least one, or all, of the polyamides of component (A1) is 9.

12. The moulding composition according to claim 1, wherein component (A) consists of:

(A1) 20-100 percent by weight of a polyamide selected from the group consisting of: at least one aliphatic semicrystalline polyamide based on acyclic dicarboxylic acids and on acyclic diamines, at least one semiaromatic semicrystalline polyamide based on dicarboxylic acids and on diamines, or a mixture thereof;

(A2) 0-80 percent by weight, of a polyamide selected from the group consisting of: at least one amorphous semiaromatic polyamide, at least one cycloaliphatic polyamide, or a mixture thereof, wherein the percentage by weight of components (A1) and (A2) together provide 100% by weight of component (A), wherein the polyamides of component (A1) are selected as semicrystalline aliphatic polyamides from the group consisting of: PA 46, 66, 66/6, 69, 610, 612, 614, 616, 618, 810, 1010, 1012, 1212, 11, 12, 6/12, 66/6/610, or are selected as semicrystalline semiaromatic polyamides from the group consisting of: PA 6T/6I, 6T/66, 6T/6I/66, 6T/610, 6T/612, 6T/614, 6T/616, 9T, 9MT, 10T, 12T, 10T/6T, 11/10T, 12/10T, 11/9T, 12/9T, 10T/1010, 10T/612;

and/or wherein the polyamides of component (A2) are selected from the group consisting of: 6T:6I and, respectively, 10T/10I with a composition range of 25:75 to 40:60;

or wherein the glass transition temperature Tg of the polyamides of component (A2) is above 110° C.

13. The moulding composition according to claim 1, wherein the proportion present in the moulding composition of component (B) is in the range 0.8-3.5 percent by weight.

14. The moulding composition according to claim 8, wherein the polyethyleneimine of component (B) is a branched polyethyleneimine having a ratio of primary to secondary amines in the range 1:2-2:1, or a ratio of primary to tertiary amines in the range 3:1-1:1, or a ratio of secondary to tertiary amines in the range 3:1-1:1;

or wherein the polyethyleneimine of component (B) is a branched polyethyleneimine with number-average molar mass Mn in the range 1000-2500 g/mol, or wherein the polyethyleneimine of component (B) is a branched polyethyleneimine with content of primary amino groups in the range 7 000-12 000 µeq/g;

or wherein the polyethyleneimine of component (B) is a branched polyethyleneimine with water content below 2 percent by weight.

15. The moulding composition according to claim 1, wherein the proportion of component (C) present is in the range 30-50 percent by weight;

or wherein component (C) consists of:

(C1) 3-25 percent by weight of particulate filler;

(C2) 75-97 percent by weight of fibrous reinforcing material, wherein the percentages by weight of components (C1) and (C2) together provide 100 percent by weight of component (C).

16. The moulding composition according to claim 8, wherein component (C) consists of:

(C1) 0-40 percent by weight of particulate filler selected from the group consisting of: carbon black, talc, mica, silicates, quartz, wollastonite, kaolin, silicas, magnesium carbonate, magnesium hydroxide, chalk, ground or precipitated calcium carbonate, limestone, feldspar, inorganic pigments, inclusive of barium sulfate, zinc oxide, zinc sulfide, lithopone, titanium dioxide (rutile, anatase), iron oxide, iron manganese oxide, metal oxides, inclusive of copper iron spinel, copper chromium oxide, zinc iron oxide, cobalt chromium oxide, cobalt aluminium oxide, magnesium aluminium oxide, mixed copper chromium magnesium oxides, mixed copper manganese iron oxides, rutile pigments inclusive of titanium zinc rutile, nickel antimony titanate, chromium antimony titanate, magnetically hard and magnetically soft metals and alloys and ceramics, hollow-sphere silicate fillers, aluminium oxide, boron nitride, boron carbide, aluminium nitride, calcium fluoride and mixtures thereof;

(C2) 60-100 percent by weight of fibrous reinforcing material selected from the group consisting of: glass fibres, carbon fibres, graphite fibres, aramid fibres, nanotubes and mixtures thereof, where the fibres of component (C2) can have circular or non-circular cross section, wherein the percentages by weight of components (C1) and (C2) together provide 100 percent by weight of component (C).

17. The moulding composition according to claim 1, wherein the proportion of component (D) present is in the range 0.2-2.0 percent by weight;

or wherein the additives of component (D) are selected from the group consisting of: ageing retarders, antioxidants, antiozonants, light stabilizers, UV stabilizers, UV absorbers, UV blockers, inorganic heat stabilizers based on copper halides and on alkali metal halides, organic heat stabilizers, other stabilizers, conductivity additives, optical brighteners, processing aids, nucleating agents, crystallization accelerators, crystallization retarders, flow promoters, lubricants, mould-release agents, plasticizers, organic pigments and dyes, marking materials and mixtures thereof.

\* \* \* \* \*